(12) United States Patent
Satoh

(10) Patent No.: US 6,700,734 B2
(45) Date of Patent: *Mar. 2, 2004

(54) CARTRIDGE LIBRARY APPARATUS WITH AN OPENABLE DOOR FOR STORING CARTRIDGES

(75) Inventor: Tsutomu Satoh, Yamagata (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 85 days.

(21) Appl. No.: 09/504,584

(22) Filed: Feb. 15, 2000

(65) Prior Publication Data

US 2003/0039056 A1 Feb. 27, 2003

(30) Foreign Application Priority Data

Mar. 18, 1999 (JP) .......................... 11-074513

(51) Int. Cl.$^7$ .............................................. G11B 33/02
(52) U.S. Cl. ....................................... 360/92; 369/30.4
(58) Field of Search .................. 360/92, 91; 369/30.06, 369/30.02, 63, 69, 77.2, 79, 292, 30.4, 30.41, 30.42, 30.48, 30.49; 221/21, 1.57; 160/201; 16/221; 312/283

(56) References Cited

U.S. PATENT DOCUMENTS

| | | | | |
|---|---|---|---|---|
| 5,147,122 A | * | 9/1992 | Short .......................... | 312/283 |
| 5,449,229 A | * | 9/1995 | Aschenbrenner et al. ..... | 221/21 |
| 5,549,149 A | * | 8/1996 | Sills et al. ................... | 160/201 |
| 5,967,339 A | * | 10/1999 | Utsumi et al. ............. | 211/1.57 |
| 6,163,431 A | * | 12/2000 | Fleckenstein et al. ......... | 16/221 |

FOREIGN PATENT DOCUMENTS

| | | | |
|---|---|---|---|
| EP | 505938 A1 | * | 3/1992 |
| JP | 5-128683 | | 5/1993 |
| JP | 10162462 A | * | 6/1998 |
| JP | 10-162462 | | 6/1998 |
| JP | 2000268550 A | * | 9/2000 |

* cited by examiner

Primary Examiner—Tianjie Chen
(74) Attorney, Agent, or Firm—Foley & Lardner (57) ABSTRACT

A cartridge library apparatus according to the present invention comprises door 1 provided openably to apparatus body C and having a multiplicity of cells 4 for housing cartridge W in an inner surface, shutter 2 provided in apparatus body C and covering an opening portion of apparatus body C when door 1 is open, and a driving mechanism for driving the opening/closing of the shutter. Shutter 2 comprises a plurality of shutter brackets 17 to 24 in plane plate shape swingably coupled by hinges and is taken up around rotor 15 with a motor of the driving mechanism which is activated in response to the opening and closure of the door.

9 Claims, 8 Drawing Sheets

CARTRIDGE LIBRARY APPARATUS WITH AN OPENABLE DOOR FOR STORING CARTRIDGES

BACKGROUND OF THE INVENTION

1. Field of the Invention

The present invention relates to a cartridge library apparatus for housing recording media in a plurality of cartridges and selecting a specified cartridge from the cartridges to perform read/write processing of information recorded in the cartridge.

2. Description of the Related Art

The aforementioned cartridge library apparatus has been developed for housing a plurality of removable storage media to facilitate addition and update of stored information in response to a demand for a significant increase in storage capacity associated with improved performance of computers. The apparatus has a housing portion for housing a plurality of removable storage media such as magnetic tape cartridges or optical disk cartridges in which a specified storage medium of the storage media is automatically unloaded and loaded to a read/write portion for processing stored information.

A plurality of cartridges housed in the housing portion are individually designated identification numbers such as predetermined bar codes. When a specific cartridge is to be selected, a hand robot provided in a body of the apparatus is manipulated such that an end of the hand robot irradiates laser light to read an identification number with a sensor for selecting the specified cartridge.

Typically, an operator performs loading/unloading of and changeover to a replacement cartridge in such a cartridge library apparatus as required. Since such loading/unloading operations of a cartridge by an operator may cause an accidental fall of the cartridge into the apparatus body, measures have been conventionally taken to prevent such a fall.

Figure 1:
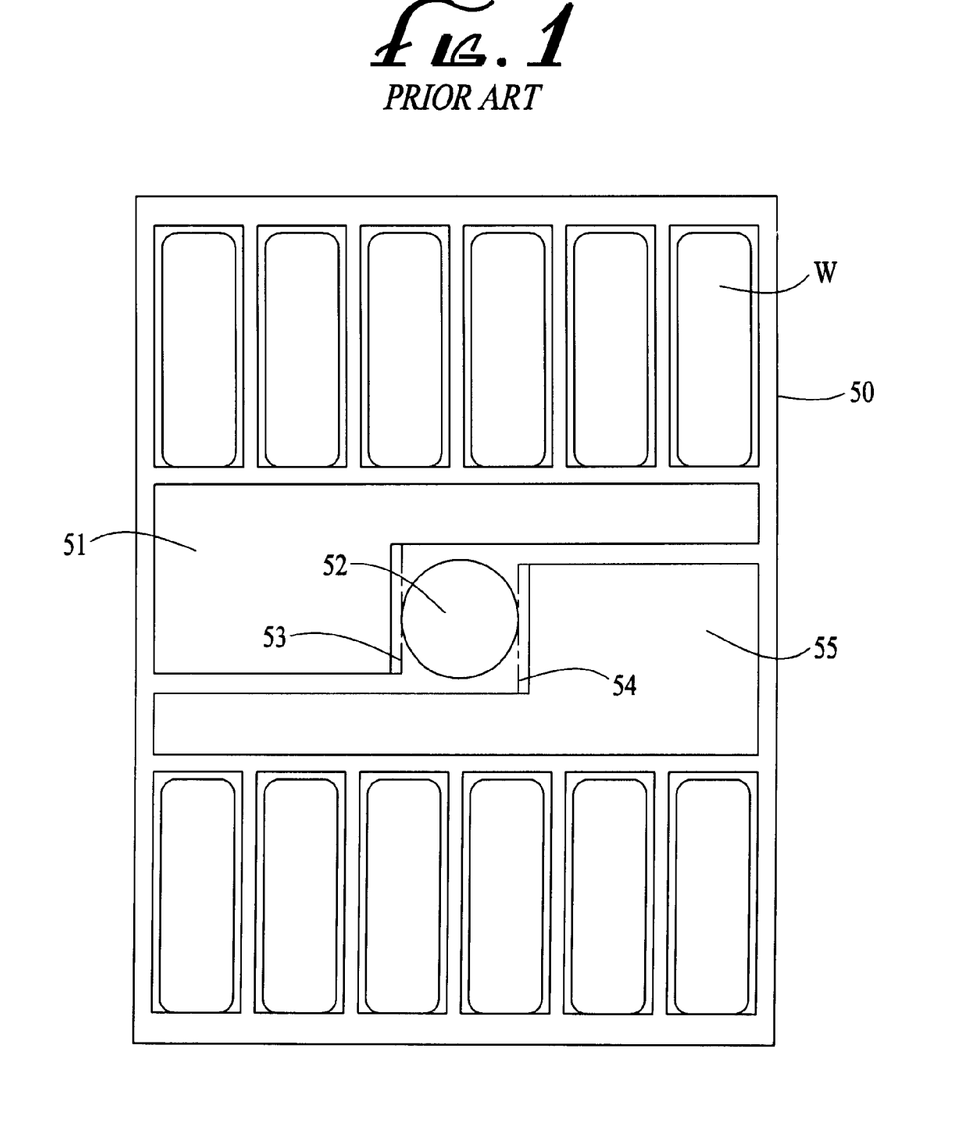
FIG. 1 is a front view showing an example of a prior art.
Figure 2:
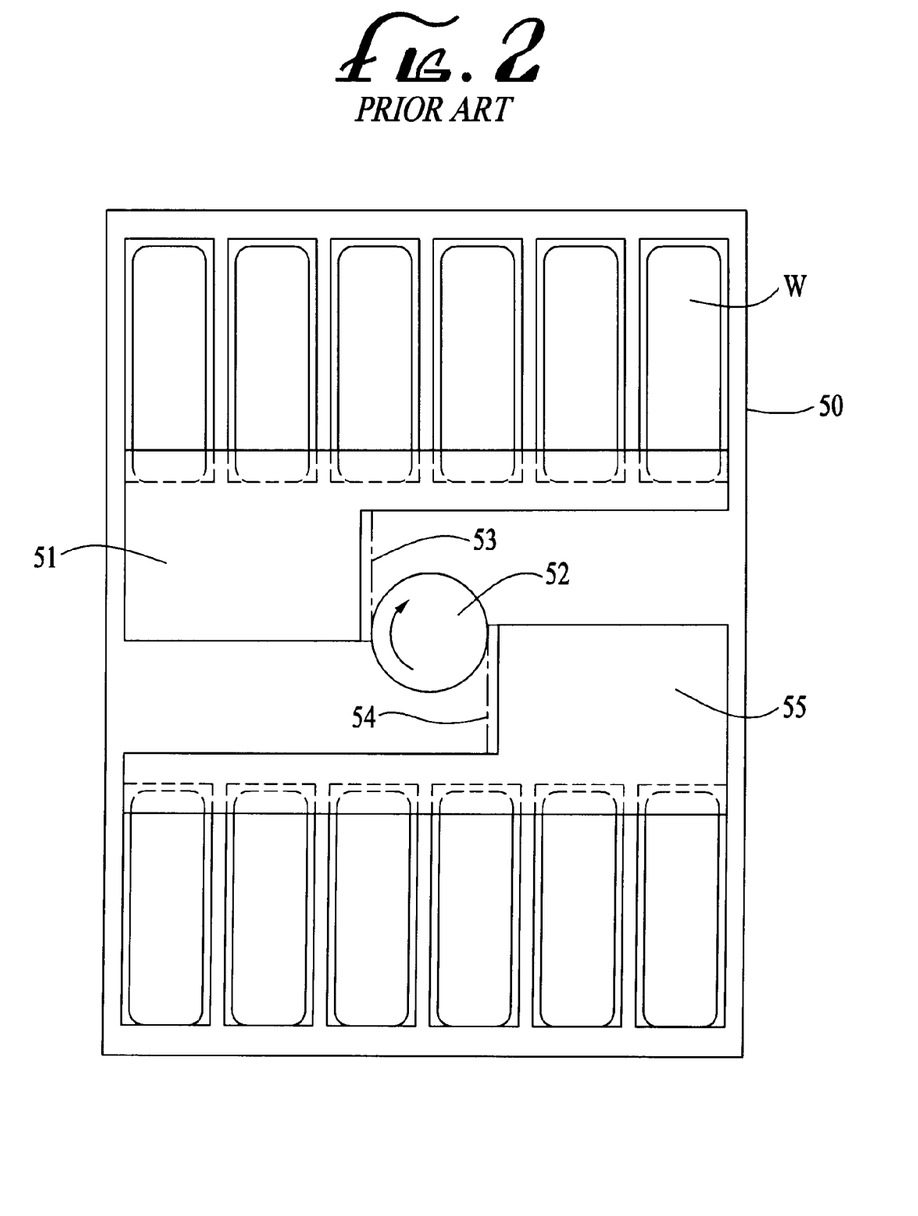
FIG. 2 is a front view showing a held cartridge in the prior art example in FIG. 1.

For example, JP-A-5-128683 discloses a technique in which, as shown in FIG. 1 and FIG. 2, gear 52 for a driving motor is disposed in a central portion of housing rack 50 such that rack 53 and rack 54 mounted respectively to L-shaped shutters 51 and 55 are engaged with gear 52 in an opposite positional relationship.

When an operator is to load or unload cartridge W in housing rack 50 for operation, the operator rotates gear 52 for a driving motor clockwise immediately before the operation to move shutter 51 and shutter 55 mounted to rack 53 and rack 54 to a position at which the shutters partially cover cartridge W as shown in FIG. 2, thereby preventing cartridge W from falling into the apparatus body.

In the aforementioned prior art, however, shutters 51 and 55 do not entirely cover the housing rack when an operator performs loading/unloading operations of a medium. This leaves problems where, for example, a foreign matter such as a tool falls into the housing rack or laser light irradiated by a hand robot is not blocked but applied directly to the operator since the interior of the apparatus body is exposed at a gap which is not covered with the shutters.

The present invention is made in view of such conventional problems, and it is an object of the present invention to provide a cartridge library apparatus capable of preventing a cartridge from falling and of preventing laser light from leaking and radiating outside when a cartridge is loaded/unloaded.

SUMMARY OF THE INVENTION

A cartridge library apparatus according to the present invention is characterized in that it has cells for individually containing a plurality of cartridges in an inner surface of a door mounted openably to an apparatus body, and the apparatus body is provided with a shutter for covering the entire surface of an opening portion of the apparatus body when the door is open and a driving mechanism for driving the opening and closing of the shutter.

The apparatus is provided with a shutter closure detecting sensor on the apparatus body side for detecting the closure of the shutter and a lock mechanism of the door provided on the door side for unlocking the door on the basis of a detection signal from the shutter closure detecting sensor.

Preferably, the shutter comprises a plurality of shutter brackets in planar plate shape and hinges for swingably coupling the respective plates of the plurality of shutter brackets, and a guide rail is provided along the opening portion of the apparatus body for linearly guiding these shutter brackets.

The driving mechanism preferably comprises a rotor to which one end portion of the shutter is swingably coupled for taking up the shutter and for pushing out the shutter along the guide rail, and a motor for rotating the rotor.

The apparatus having such a driving mechanism is preferably provided with a friction clutch between the rotor and the motor.

Additionally, a cam is preferably provided in a side portion of the rotor for guiding the shutter brackets to be taken up around the rotor toward the guide rail.

Each of the shutter brackets is preferably provided with a roller for rolling on the guide rail.

A freely running belt to be contacted by the roller is preferably stretched with a plurality of pulleys between the guide rail and the cam.

With the configuration as described above, the cartridge library apparatus according to the present invention produces the following favorable effects.

First, since the shutter covers the entire surface of the opening portion of the library apparatus body in response to the opening of the door, it is possible to prevent laser light for reading identification codes from radiating outside, allowing the protection of an operator.

Additionally, a cartridge which is to exit from the cell impinges on the shutter and is pushed back into the cell, thereby making it possible to prevent the cartridge from falling into the apparatus body. For this reason, when an operator loads a cartridge into the cell provided in the door, a fall of the cartridge into the apparatus body can be prevented even if the operator closes the door in a state where the cartridge is partially out of the cell.

Furthermore, the shutter is mounted vertically and taken up for housing, thereby allowing the mounting area of the shutter to have the same area as that of all the loaded media.

The above and other objects, features, and advantages of the present invention will become apparent from the following description referring to the accompanying drawings which illustrates an example of a preferred embodiment of the present invention.

DETAILED DESCRIPTION OF THE PREFERRED EMBODIMENT

In the following, an embodiment of the present invention will be described with reference to FIG. 3 to FIG. 8.

Figure 3:
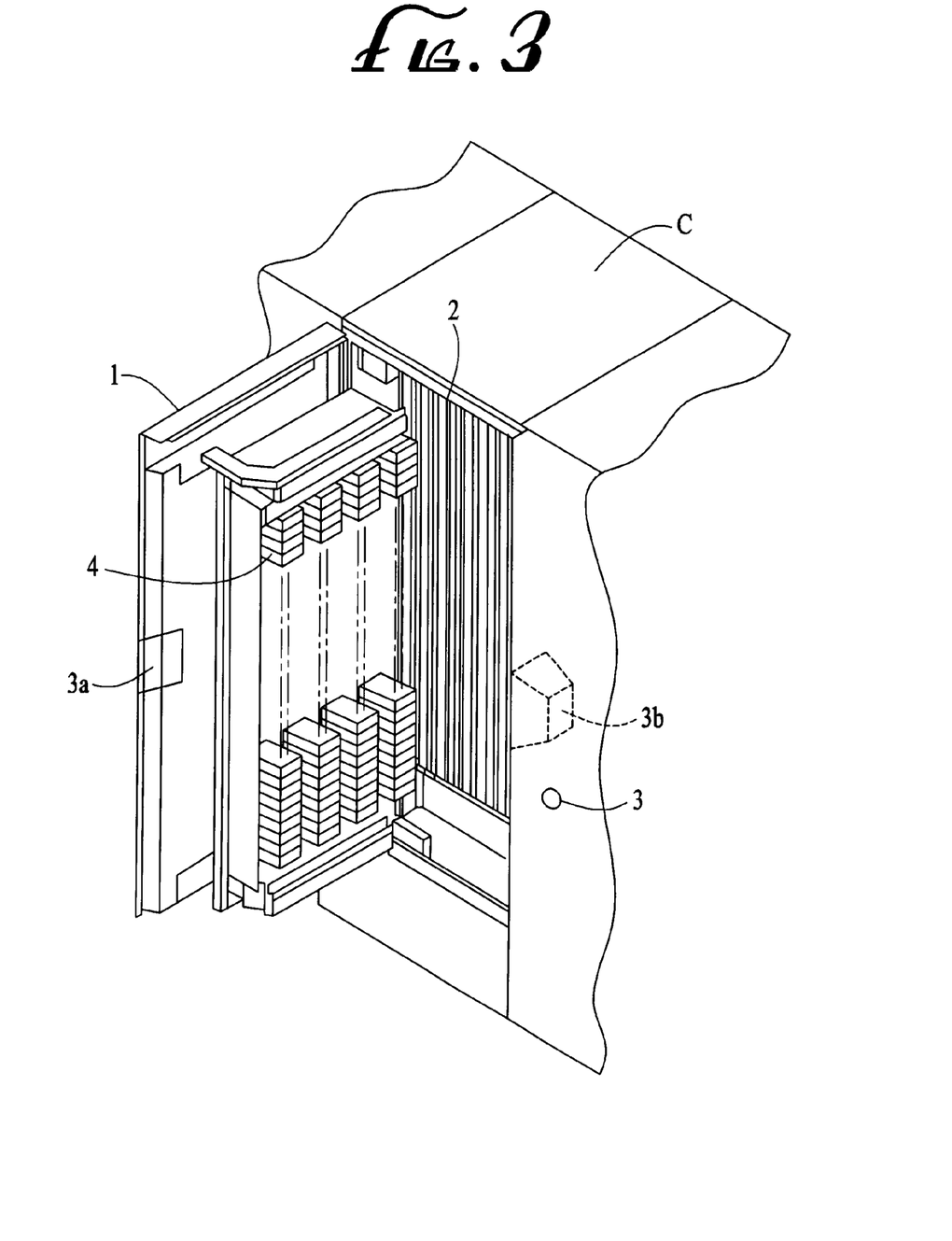
FIG. 3 is a perspective view showing an appearance of main portions in a first embodiment of the present invention.

In FIG. 3, a cartridge library apparatus in the embodiment comprises apparatus body C which is a cartridge magnetic tape apparatus for performing read/write operations of a cartridge selected by a hand robot, door 1 mounted openably to apparatus body C and provided with a plurality of cells 4 for housing a plurality of cartridges W on the inner surface side facing apparatus body C, door switch 3 which is pressed for opening door 1, and shutter 2 which is driven to shield an opening portion of apparatus body C when door 1 is open.

Figure 4:
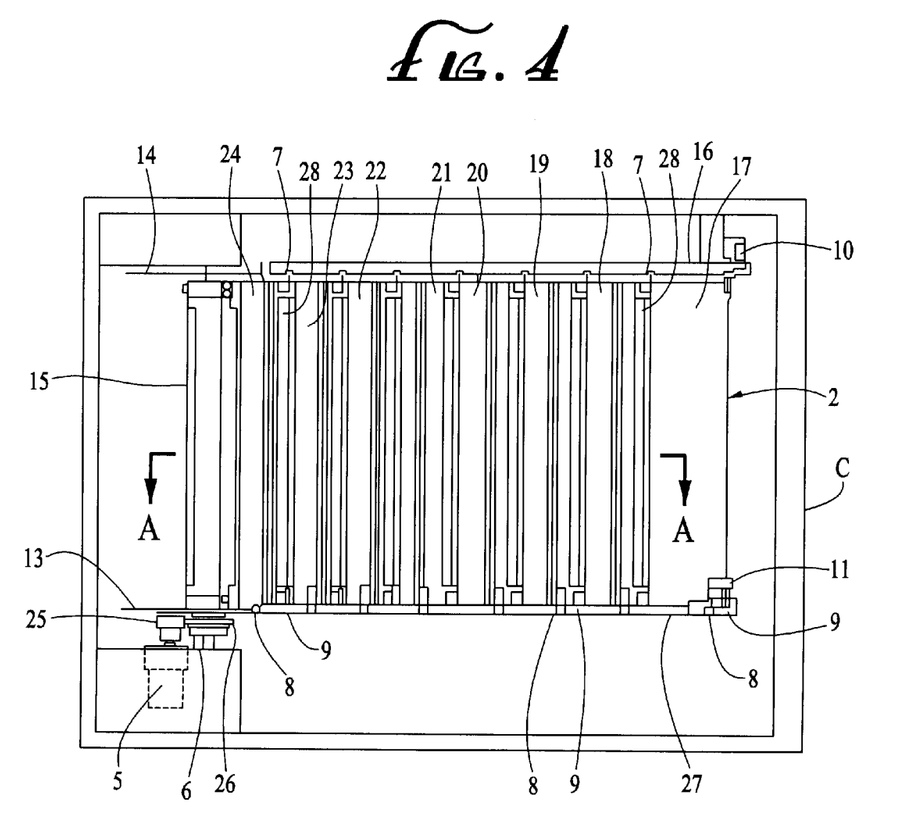
FIG. 4 is a vertical sectional view showing main portions of the embodiment in FIG. 3.
Figure 5:
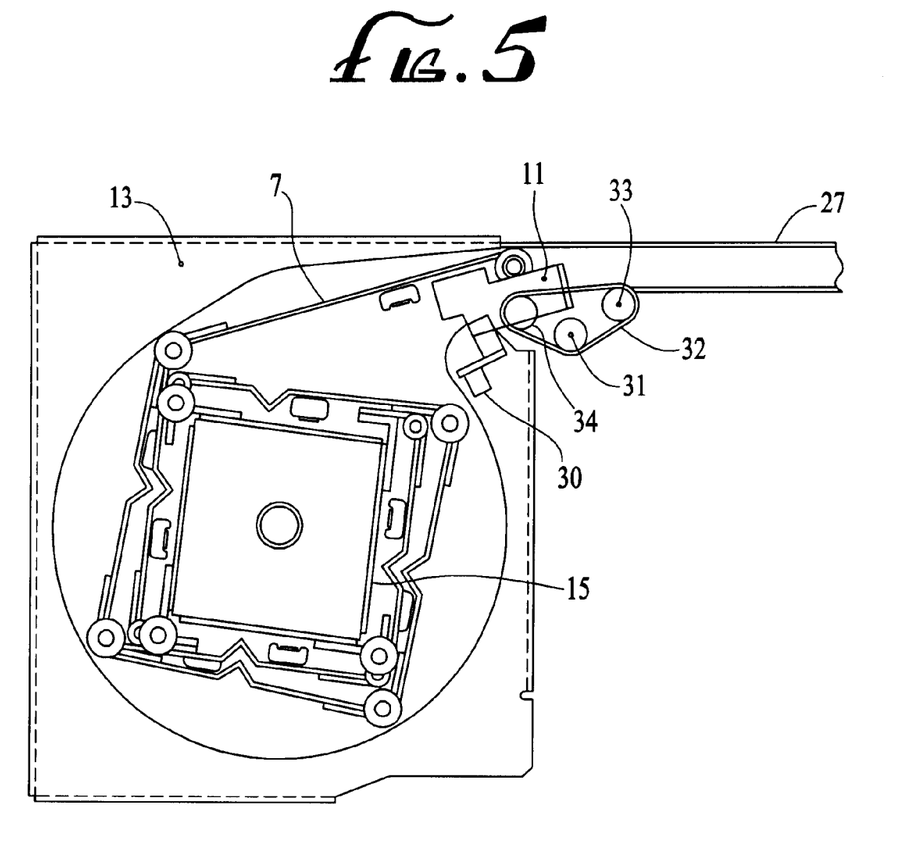
FIG. 5 is an enlarged plan view showing a contained shutter of the embodiment of the present invention.
Figure 6:
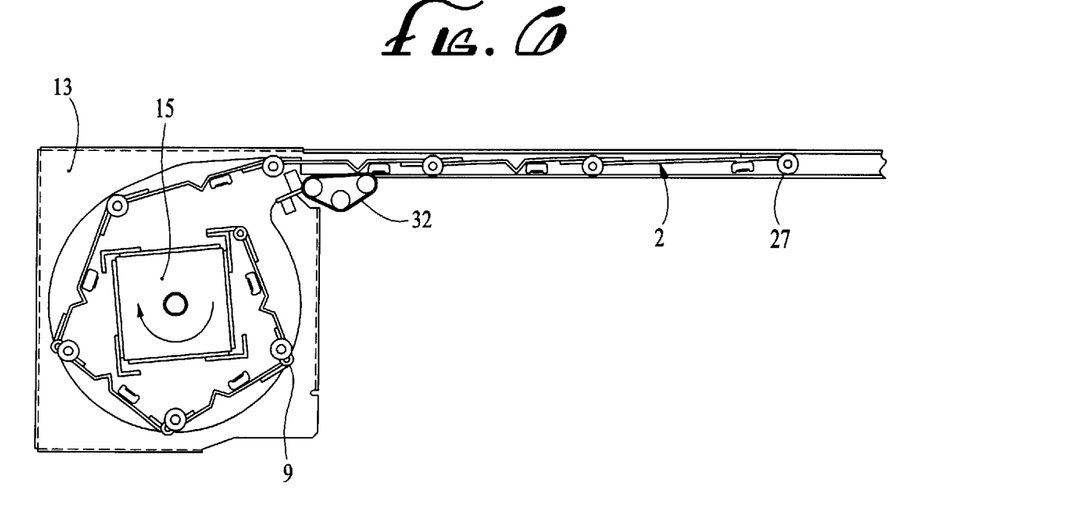
FIG. 6 is a plan view illustrating a closing operation of the shutter in which a portion thereof is omitted.

FIG. 4 and FIG. 5 show a configuration of shutter 2 in the embodiment in FIG. 3.

In FIG. 4, apparatus body C has shutter 2, a take-up mechanism, and a shutter guide mechanism. Shutter 2 comprises a plurality of shutter brackets 17 to 24 in planar plate shape swingably coupled with hinges 28 between respective shutter brackets and between shutter bracket 24 at the end and rotor 15. The take-up mechanism comprises rotor 15 for taking up and housing shutter 2 and motor 5 for rotating rotor 15. The shutter guide mechanism comprises rollers 7, 8 and 9 for guiding the movement of shutter 2, rails 27, 16 in U-shape (box shape with one side opened), and cams 13, 14.

Apparatus body C also has, as control means for the take-up mechanism, shutter closure detecting sensor 10 for detecting the closure of shutter 2 and shutter opening detecting sensor 30 for detecting the opening of shutter 2 by detecting flag 11 provided at the end portion of shutter 2. FIG. 3 shows a lock mechanism 3a provided on a side of the door for unlocking a lock 3b of said door based on a detection signal from the shutter closure detecting sensor 10.

Motor 5 is activated in response to the press of door switch 3. The rotation thereof is transferred to rotor 15 through gear 25 and gear 26.

When an overtorque occurs at the operation of shutter 2, friction clutch 6 serves not to transfer a torque equal to or higher than a predetermined value to motor 5 for protecting motor 5.

Rollers 8 of the shutter guide mechanism guide the shutter brackets in a vertical direction, rollers 9 guide the shutter brackets in a horizontal direction, and roller 7 has the same axis as that of roller 9.

Rail 27 and rail 16 in U-shape (box shape with one side opened) serve as a course for guiding shutter 2 when it moves in the cartridge magnetic tape apparatus. Cam 13 and cam 14 guide the take-up mechanism at a closing operation of shutter 2.

FIG. 5 shows a configuration of rail 27 in the embodiment.

Rail 27 comprises belt 32 for guiding rollers 7 mounted to the shutter brackets, pulley 33 and pulley 34 for guiding belt 32, and pulley 31 for adjusting the tension of belt 32 when shutter 2 is taken up.

For materials of shutter brackets 17 to 24 and hinge 28, strong metal capable of blocking laser light is desirable, and for example, an electrogalvanized steel sheet or a stainless steel sheet with favorable machinability is preferable.

Next, the operation of the cartridge library apparatus in the embodiment will be described with reference to FIG. 3 to FIG. 8.

The cartridge library apparatus in the embodiment operates as a library apparatus such that when door 2 is closed, shutter 2 is taken up and housed around rotor 15, and a hand robot, not shown, freely identifies cartridge W housed in cell 4 with laser light.

When door 1 is to be opened for replacement of cartridge W or the like, an operator first presses door switch 3. Motor 5 is then activated to rotate rotor 15, which has taken up and housed shutter 2, clockwise as shown by an arrow in FIG. 6. Rollers 7, 9 of shutter brackets 17 to 24 rotate with guide by cams 13, 14 to push out shutter 2 into the apparatus body along rails 27, 16.

Figure 7:
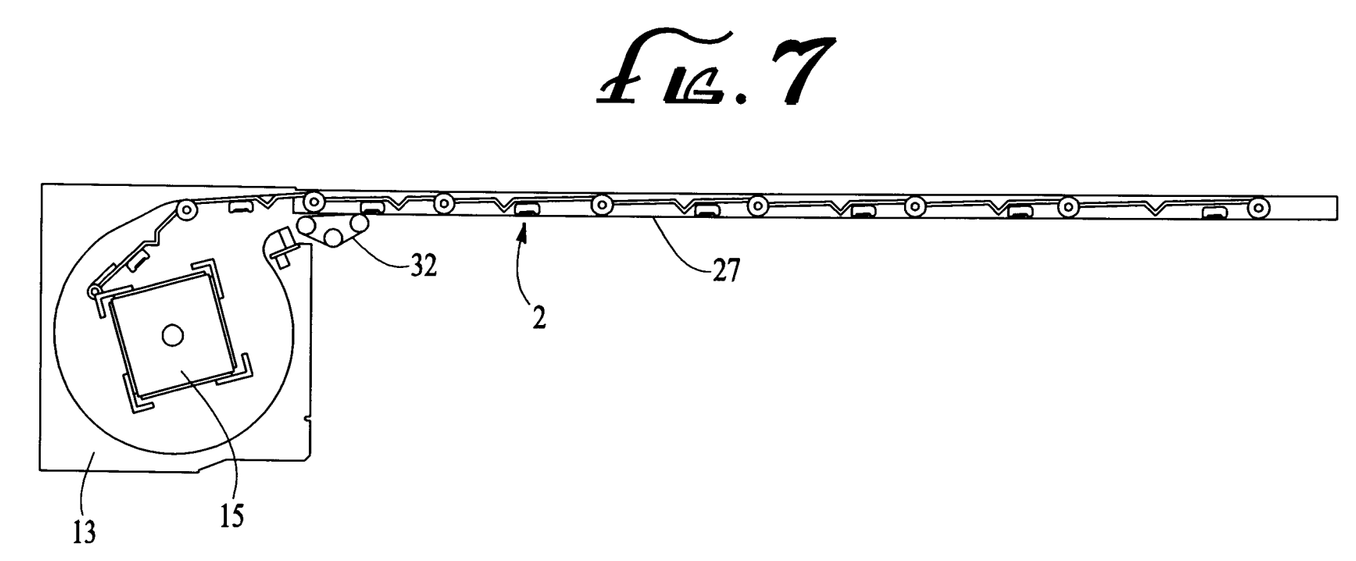
FIG. 7 is a plan view showing the opened shutter.

When shutter closure detecting sensor 10 provided on the opposite side to rotor 15 detects shutter bracket 17 pushed out into the apparatus body, a detection signal associated therewith activates motor 5 which causes a closing operation of shutter 2 taken up and housed, thereby shielding an opening portion which has been closed by door 1, as shown in FIG. 3 and FIG. 7. Thereafter, door 1 is opened.

As a result, the interior of apparatus body C becomes invisible from the exterior to prevent an operator from directly viewing laser light from a robot and to prevent cartridge W from falling into apparatus body C.

When an operator is to close door 1, the operator first presses door switch 3. Upon detection of the closure of door 1, motor 5 is activated to cause shutter 2 to rotate counter-clockwise as shown by an arrow in FIG. 8 and shutter 2 is taken up around rotor 15 serving as a core. When shutter opening detecting sensor 30 detects flag 11, the activation of motor 5 is stopped to house taken up shutter 2, and then media housed in cell 4 can be used by a hand robot.

Figure 8:
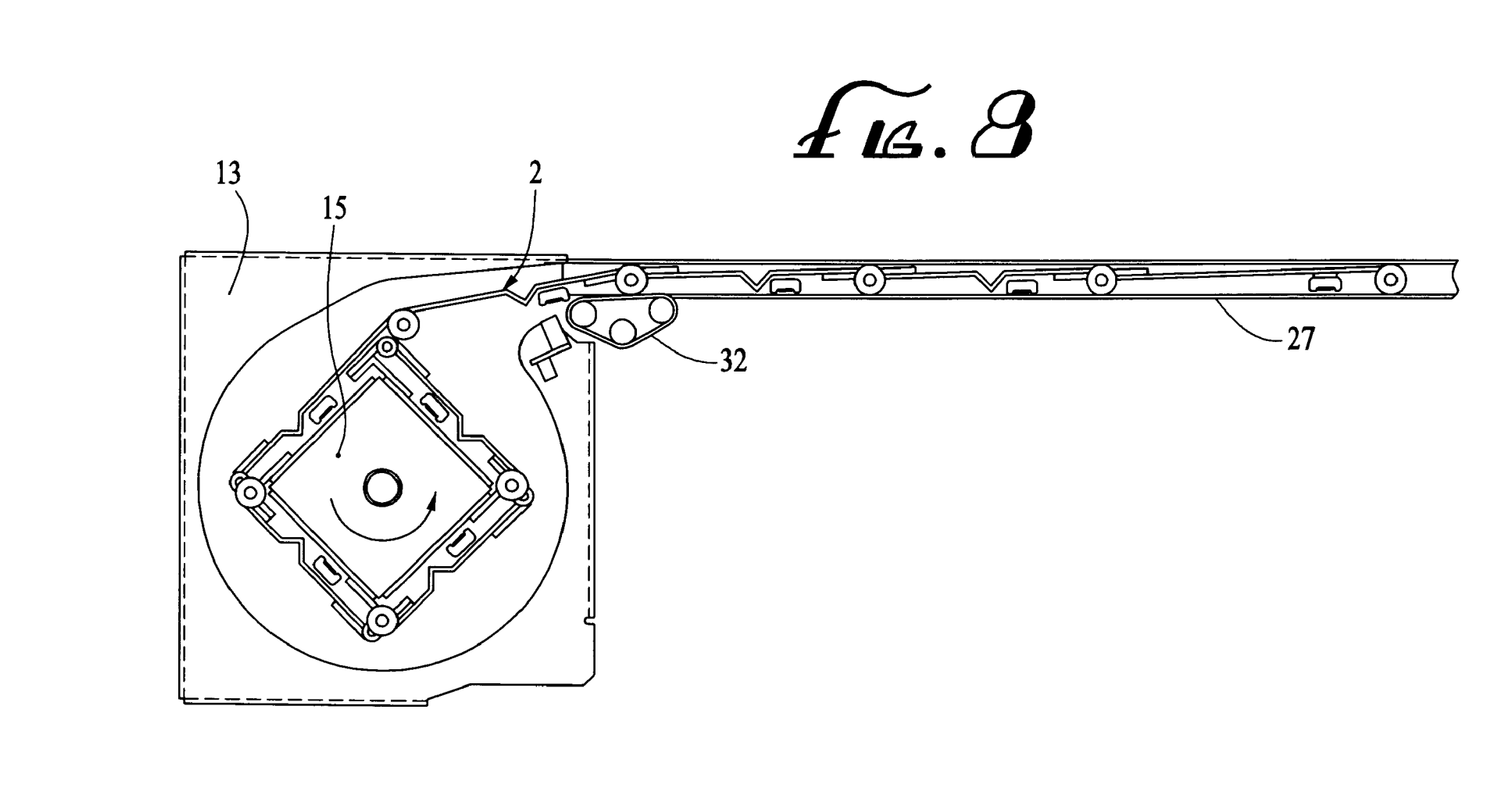
FIG. 8 is a plan view illustrating an opening operation of the shutter in which a portion thereof is omitted.

As shown in FIG. 8, when shutter 2 is taken up and housed around rotor 15, roller 8 and roller 9 of the shutter brackets make contact with belt 32 mounted to rail 27 and are rotated. This can prevent wear of rollers 8 and 9 of the shutter brackets to improve durability.

Additionally, the shutter to be taken up is vertically mounted and housed, thereby allowing the mounting area of the shutter to have the same area as that of all the media.

It is to be understood that variations and modifications of the cartridge library apparatus disclosed herein will be evident to those skilled in the art. It is intended that all such modifications and variations be included within the scope of the appended claims.

What is claimed is:

1. A cartridge library apparatus for selecting a specified cartridge from a plurality of removable cartridges with a hand robot to perform read/write operations for the cartridge, said apparatus comprising:

a door having cells formed in an inner surface of said door for individually storing said plurality of removable cartridges for recording media, wherein said door is mounted openably to a body of said apparatus and operable in a first state in an open position and in a second state in a closed position in which the door covers an opening portion of said body of said apparatus;

a shutter provided in said body of said apparatus wherein said shutter covers said opening portion of said body of said apparatus in said first state where said door is in said open position; and a driving mechanism for opening and closing said shutter.

2. The cartridge library apparatus according to claim 1, further comprising:

a shutter closure detecting sensor provided on a side of said body of said apparatus for detecting a closure of said shutter; and a lock mechanism provided on a side of said door for unlocking a lock of said door based on a detection signal from said shutter closure detecting sensor.

3. The cartridge library apparatus according to claim 1, wherein said shutter includes a plurality of shutter brackets in planar plate shape and a plurality of hinges for swingable-coupling the plurality of shutter brackets, and wherein said apparatus further comprises a guide rail provided along the opening portion of said apparatus body for linearly guiding the plurality of shutter brackets.

4. The cartridge library apparatus according to claim 3, wherein said driving mechanism comprises:

a rotor to which an end portion of said shutter is swingably coupled and around which said shutter is taken up; and a motor for rotating said rotor to take up said shutter and for pushing out said shutter along said guide rail.

5. The cartridge library apparatus according to claim 4, further comprising a friction clutch provided between said rotor and said motor.

6. The cartridge library apparatus according to claim 4, further comprising a cam provided on a side portion of said rotor for guiding the plurality of shutter brackets to be taken up around the rotor toward said guide rail.

7. The cartridge library apparatus according to claim 3, wherein each of the plurality of shutter brackets has a roller for rolling on said guide rail.

8. A method for preventing a cartridge from falling in a cartridge library apparatus for storing a plurality of removable cartridges that store media in a housing portion of an openable door and that selects a specified cartridge from the housing portion with a hand robot to perform read/write operations of the cartridge, said method comprising the steps of:

providing an openable shutter between the door and an opening portion of a body of said apparatus, each of said door and shutter having a size for individually covering said opening portion; and maintaining said opening portion covered by:

(a) opening the shutter only after closing when the door and thereby covering said opening portion using said door without said shutter;

closing the shutter before opening the door and thereby covering said opening portion using said shutter; and maintaining said shutter closed while said door is open, and thereby covering said opening portion using said shutter without said door.

9. A cartridge library apparatus for selecting a specified cartridge from a plurality of removable cartridges with a hand robot to perform read/write operations for the cartridge, said apparatus comprising:

a door having cells formed in an inner surface of said door for individually storing said plurality of removable cartridges for recording media, and wherein said door is mounted openably to a body of said apparatus;

a shutter provided in said body of said apparatus wherein said shutter covers an opening portion of said body of said apparatus in a state where said door is in an open position;

a driving mechanism for driving an opening and a closing of said shutter;

wherein said shutter includes a plurality of shutter brackets in planar plate shape and a plurality of hinges for swingable-coupling the plurality of shutter brackets, and wherein said apparatus further comprises a guide rail provided along the opening portion of said apparatus body for linearly guiding the plurality of shutter brackets;

wherein each of the plurality of shutter brackets has a roller for rolling on said guide rail; and wherein the apparatus further comprises a freely running belt contracted by the roller and stretched with a plurality of pulleys between said guide rail and a cam.

* * * * *